United States Patent
Coupe et al.

(10) Patent No.: US 9,781,619 B2
(45) Date of Patent: Oct. 3, 2017

(54) TELECOMMUNICATION SYSTEM AND METHOD

(75) Inventors: Patrice Coupe, Paris (FR); Wladimir Bocquet, Maisons Laffitte (FR); Romain Lenglet, Kanagawa-ken (JP)

(73) Assignee: 3G Licensing S.A., Luxembourg (LU)

( * ) Notice: Subject to any disclaimer, the term of this patent is extended or adjusted under 35 U.S.C. 154(b) by 34 days.

(21) Appl. No.: 12/808,293

(22) PCT Filed: Dec. 17, 2008

(86) PCT No.: PCT/EP2008/067721
§ 371 (c)(1),
(2), (4) Date: Jun. 15, 2010

(87) PCT Pub. No.: WO2009/080646
PCT Pub. Date: Jul. 2, 2009

(65) Prior Publication Data
US 2010/0273507 A1   Oct. 28, 2010

(30) Foreign Application Priority Data

Dec. 21, 2007  (EP) .................................. 07305004

(51) Int. Cl.
*H04W 24/10*  (2009.01)
*H04W 16/20*  (2009.01)
*H04W 24/02*  (2009.01)

(52) U.S. Cl.
CPC ............ *H04W 24/10* (2013.01); *H04W 16/20* (2013.01); *H04W 24/02* (2013.01)

(58) Field of Classification Search
CPC ..... H04W 24/02; H04W 24/04; H04W 24/10; H04W 52/0261; H04W 4/025; H04W 4/02; H04W 16/00; H04W 16/20
USPC ............. 455/423, 425, 434, 446–449, 67.11, 455/552.1, 572, 573
See application file for complete search history.

(56) References Cited

U.S. PATENT DOCUMENTS

| | | | |
|---|---|---|---|
| 6,046,698 A | 4/2000 | Pandey | |
| 6,427,074 B1* | 7/2002 | Chavez et al. | 455/417 |
| 6,754,470 B2* | 6/2004 | Hendrickson et al. | 455/67.11 |
| 2004/0002328 A1* | 1/2004 | Chandra et al. | 455/422.1 |
| 2006/0128371 A1* | 6/2006 | Dillon et al. | 455/423 |
| 2006/0183487 A1 | 8/2006 | Allen et al. | |
| 2008/0096579 A1* | 4/2008 | Gill | G01S 5/02 455/456.1 |
| 2008/0132225 A1* | 6/2008 | Ranta et al. | 455/424 |

(Continued)

FOREIGN PATENT DOCUMENTS

EP   0 740 482 A1   10/1996
KR   20010050257 A   6/2001

*Primary Examiner* — Nam Huynh
(74) *Attorney, Agent, or Firm* — Drinker Biddle & Reath LLP

(57) ABSTRACT

A method for a user equipment to transmit a set of data to at least a first telecommunication network, said user equipment comprising a rechargeable power supply, said method comprising the acts of acquiring network related information from at least a second telecommunication network by the user equipment and initiating the transmission of a set of data to the at least first telecommunication network upon detection of the charging of the power supply, the set of data comprising said network related information.

7 Claims, 4 Drawing Sheets

(56) References Cited

U.S. PATENT DOCUMENTS

2008/0300026 A1* 12/2008 Ban et al. .................... 455/572
2009/0098914 A1* 4/2009 Martin-Cocher et al. .... 455/572

* cited by examiner

| Field | Comment |
|---|---|
| Header | Header describing the event |
| Event type | Type of the event (ex. battery charging) |
| Event data | Charging duration |
| Priority | Priority level with which the event should be handled |
| Signal | Contains information about the signal received by the user equipment |
| Network data | Information about the BS, e.g. cell ID |
| User data | Optional, User related information, ID, profile |
| Time stamp | Time the event was triggered |
| Service data | The service ID that has issued the location information |
| Event data | Location information (e.g. coordinates or ID for discrete point location). It may also contain precision level. Speed may be included as well |

Figure 2

TELECOMMUNICATION SYSTEM AND METHOD

CROSS REFERENCE TO RELATED APPLICATIONS

This application is the U.S. national phase of the International Patent Application No. PCT/EP2008/067721 filed Dec. 17, 2008, which claims the benefit of European Patent Application No. 07305004.9 filed Dec. 21, 2007, the entire contents of which are incorporated herein by reference.

BACKGROUND

The present invention relates in general to telecommunication networks and systems, more specifically telecommunication networks and systems enabled for collecting network coverage information.

Telecommunication networks provide a facility for communicating to and from a user equipment (UE) using mobile devices that comprises a rechargeable power supply.

For the deployment and the maintenance of a telecommunication network, coverage deployment software and field radio measurement of the coverage are very important, especially for areas with insufficient network coverage or high densification of UEs.

The past and current network deployments (2G and 3G) show that handling efficiently indoor coverage is a key to insure a good quality of service for the subscribers of telecommunication networks. Communication from indoor environments is very important in terms of usage for said subscribers, but, due to access rights for buildings, the telecommunication network operators have very limited means to measure indoor coverage within said buildings.

Previous patent documents such as Korean Patent Document No. 20010050257 and United States Patent Publication No. 2006/183487 rely on network level information in known geographical location to detect zones with insufficient coverage to take measures to improve the quality of service. However, even though Location Based Services (LBS) based on Global Positioning System (GPS) are widely spread, these methods are not suitable for the detection of indoor coverage problems, where satellite signal cannot be properly acquired. Moreover, those systems require measurement, calculations and information processing that all consume a large amount of the user equipment capabilities.

Today there is a need for an information collection solution that can be easily implemented on the existing and future telecommunication infrastructures.

SUMMARY

It is an object of the present system to overcome disadvantages and/or make improvement over the prior art.

To that extent, various embodiments provide a telecommunication method for a user equipment to transmit a set of data to at least a first telecommunication network, said user equipment comprising a rechargeable power supply, said method comprising the acts of: acquiring network related information from at least a second telecommunication network by the user equipment; initiating the transmission of a set of data to the at least first telecommunication network upon detection of the charging of the power supply, the set of data comprising said network related information.

Mobile user equipments have a battery with an autonomy that depends on the usage. The battery needs to be charged regularly for the user equipment to work properly. The present system and method relies upon the applicant's observation that charging is commonly performed by many users at home, at work, or in the car thanks to a dedicated cradle. In the two first situations, the user equipments are most likely to be inside a building and with mobility restricted by the length of the power cord. In other words, in many cases the fact that the user equipment is in charging status is an implicit indication that the user equipment is in indoor situation, but still at a location where the user still wants to be reached.

The method according to one embodiment describes the estimation of indoor coverage and the detection and identification of potential network coverage problems, based on detection on the user equipment power charging events reported to the network for analysis.

The main advantages are the following:
Relying on an action all users perform (battery charging) on a very regular basis (from several times a week if not daily)
Cost effectiveness compared to field measurement campaign
Non intrusive acquisition of information.

Embodiments relates to a method for acquiring, sending and processing network-related information to further modify network parameters when required as follows. The acquiring of network related information may be triggered upon detection of the charging of the power supply. The network related information may comprise the signal strength of the at least second telecommunication network measured by the user equipment. The user equipment may further be operable to acquire its location and wherein the network related information may comprise the location acquired by the user equipment. The act of initiating the transmission of the set of data may be followed by an act of transmitting said set of data upon detection of a triggering event, said triggering event being at least one of: a sufficient network of the at least first telecommunication network availability allowing data transmission; the availability of the user equipment; a request received from the at least first telecommunication network; a delay from the detection of the charging of the power supply; and the charging of the power supply. The set of data may comprise an indication of the charging of the power supply of the user equipment. The first and second telecommunication networks may be identical.

In an embodiment, in a first telecommunication network to receive from a user equipment of said first telecommunication network network related information from at least a second telecommunication network, said user equipment comprising a rechargeable power supply, the method comprises the acts of: receiving a set of data from the user equipment, said set of data comprising: network related information acquired by the user equipment prior to sending the set of data; and an indication on the charging of the power supply, said charging having initiated the sending of said set of data by the user equipment. The network related information may comprise the signal strength of the at least second telecommunication network measured by the user equipment. The user equipment may further be operable to acquire its location and wherein the network related information comprises the location acquired by the user equipment. The method may further comprise the act of modifying the first telecommunication network parameters according to the received network related information. The method may further comprise the act of optimizing the first telecommunication network coverage using the network related information. The method may further comprise a preliminary act of requesting network related parameters.

Various embodiments also include a system for acquiring, sending and processing network-related information to further modify network parameters when required, including a telecommunication system comprising a user equipment operable to transmit a set of data to an event manager in a first telecommunication network, said user equipment comprising a rechargeable power supply, said user equipment being operable to: acquire network related information from at least a second telecommunication network by the user equipment; initiate the transmission of a set of data to the at least first telecommunication network upon detection of the charging of the power supply, the set of data comprising said network related information; said event manager being operable to receive the set of data from the user equipment. The network related information may comprise the signal strength of the at least second telecommunication network measured by the user equipment. The network related information may comprise an indication on the charging of the power supply, said charging having initiated the sending of said set of data by the user equipment. The user equipment may further be operable to acquire its location and wherein the network related information comprises the location acquired by the user equipment. The system may be further operable to optimize the first telecommunication network coverage using the network related information.

Various embodiments also relate to a user equipment for acquiring and sending network-related information, including a user equipment to transmit a set of data to a first telecommunication network, said user equipment comprising a rechargeable power supply, said user equipment being operable to: acquire network related information from at least a second telecommunication network by the user equipment; initiate the transmission of a set of data to the at least first telecommunication network upon detection of the charging of the power supply, the set of data comprising said network related information. The network related information may comprise the signal strength of the telecommunication network measured by the user equipment. The user equipment may be further operable to acquire its location and wherein the network related information comprises the location acquired by the user equipment. The set of data may comprise an indication of the charging of the power supply of the user equipment.

An embodiment also relates to a non-transitory computer program product, comprising a computer usable medium having a computer readable program code embodied therein, said computer readable program code adapted to be executed to implement one or more of the above-described methods.

BRIEF DESCRIPTION OF THE DRAWINGS

Embodiments of the present invention will now be described by way of example only with reference to the accompanying drawings, where like parts are provided with corresponding reference numerals, and in which:

FIG. 2 schematically illustrates the information fields, or parameters, of a message exchanged between a user equipment and a telecommunication network according to an embodiment;

DETAILED DESCRIPTION

Telecommunication networks allow mobile user equipments (UEs) to communicate. Mobile UEs have a power supply, or battery, with an autonomy that depends on the usage and that needs charging. The battery needs to be charged regularly for the user equipment to work properly. Charging is commonly performed by many users at home, at work, or in their car thanks to a dedicated cradle. In the first two situations, the user equipments are most likely to be inside a building and with mobility restricted by the length of the power cord. In other words, in many cases the fact that the user equipment is in charging mode is an implicit indication that the user equipment is in indoor situation, but still at a location where the user still wants to be reached.

According to an embodiment of the present invention, a method is provided for and comprises the acts of:

Acquiring the status of the user equipment, said status being connected/disconnected to a source of energy;

Storing this status, along with other information such as cell ID, Bit Error Rate (BER) or Frame Error Rate (FER) or any relevant wireless indicator;

Communicating those data using messages called event messages hereafter, in real time or with delay (e.g., depending on communication conditions or if the UE is busy doing something else (e.g., with another application)), to the telecommunication network, e.g., through a Base Station (BS);

Collecting and storing those data in a database in the network, e.g., to make a cartography of the network radio coverage;

Analysing those data, which gives indicators of network coverage in indoor situations, possibly correlating them with external information such as, e.g., the address of the user, in order to further improve the network radio coverage.

In order to communicate the data in real time or with delay, the act of initiating the transmission of the (set of) data is followed by an act of transmitting said set of data upon detection of a triggering event, where the triggering event may be at least one of:

a sufficient network of the at least first telecommunication network availability allowing data transmission;

the availability of the user equipment;

a request received from the at least first telecommunication network;

a delay from the detection of the charging of the power supply;

the charging of the power supply.

The method according to the an embodiment is further down illustrated for the same network in which the UE collects from and sends to the network related information, but the case where network related information is collected from one or several telecommunication network(s) and sent to one or several telecommunication network(s) (not necessarily the same) are also within the scope of the present invention.

According to one exemplary embodiment, several subsystems, or system units, and their related data and messages are further described by way of example.

Figure 1:
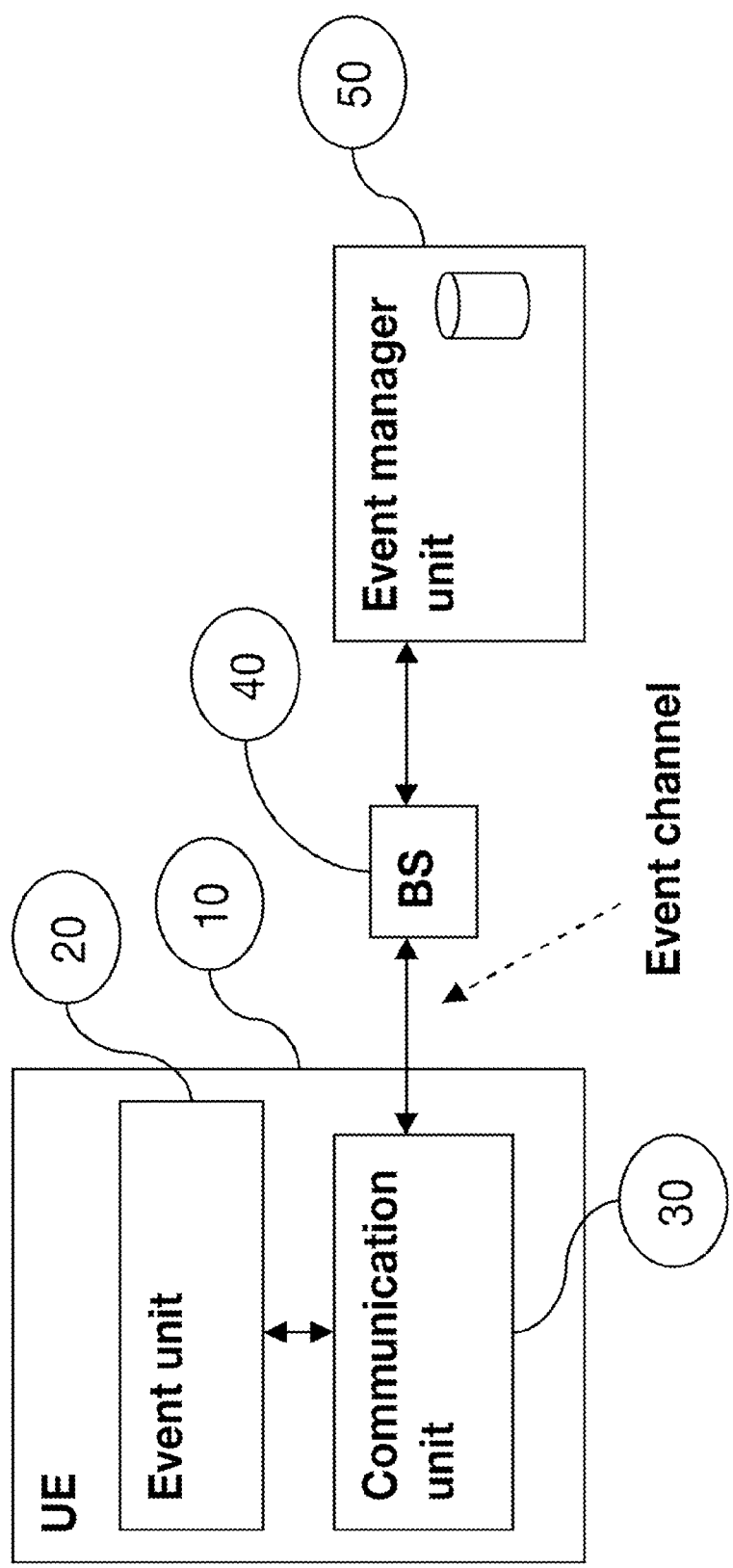
FIG. 1 schematically illustrates a system according to an embodiment.

FIG. 1 describes a system according to an embodiment wherein a User Equipment (UE) 10 comprises an event unit 20 and a communication unit 30. Said UE 10 communicates through the Base Station (BS) 40 with an event manager unit 50 located in the telecommunication network.

The event unit 20 is in charge of acquiring the battery charging event and of adding additional information regarding the current environment (network coverage parameters, location etc.) The event sub-system acquires the information of the user equipment being connected to an energy source, for instance an electric plug, to charge its battery. The event sub-system is capable of storing events that have been acquired by the user equipment.

The communication unit 30 is a subsystem in charge of handling the wireless communication. It has knowledge of the signal conditions and, in particular, of the strength of the signal associated with the coverage of the location of the user equipment. Thus, when a user equipment is plugged for charging its battery, the signal strength (or any relevant parameter for the estimation of the quality of the network coverage) is measured and integrated into an event message that will further be sent to the event manager subsystem 50 of the telecommunication network. Said message may be structured into a frame. The communication unit 30 interacts with the BS 40 of the telecommunication network. The communication to the BS can be ensured over a Media Access Control (MAC) layer event channel, with proper scheduling and prioritization of event information delivery.

In a possible implementation a frame of the message to be transferred over the event channel may be as follows:
  MAC header which is added to turn the message into a frame ready for transmission over the network;
  Event attributes which comprises event-related information (e.g., battery charging, charging time, location, etc.);
  Optional attributes (e.g., service information, etc.);
  Checksum for allowing error detection in the transmitted bits of information.

The Base Station 40 collects and transfers the event message to the event manager unit 50.

This event manager unit 50 receives event messages from the BS. This unit allows:
  Real time management
  Event information storing
  Analysis on collected information.

The event manager unit 50 may be further connected to statistics and reports tools (e.g., statistics and reports servers).

The message or data transfer between the mobile user equipment and the event manager sub-system may be performed over a Power Line Communication (PLC) or a physical or wireless connection to another device such as a Set Top Box that acts as the BS in the embodiment described above.

Examples of application of various embodiments may be the measurement of indoor coverage such as:
  the distribution of indoor coverage in the cells of a cellular access network
  the finer analysis if correlated with time and user information This information provides evidence to assist the operational decision of network densification and/or management.

FIG. 2 describes the information structure of an event message generated by the event sub-system.

A header parameter may give a description of the event, a event type field or parameter may give the type of the event, an event data parameter may give the charging duration. A priority parameter may give the priority level with which the event should be handled. A field may be reserved for the information on the signal conditions such as the signal strength, the bandwidth for an application or any parameter relevant of the network coverage of the user equipment at the time the battery is charging. Signal characteristics of multiple networks may also be given in the case of multimode user equipments (e.g., 4G+WLAN or 4G+DVB-H or ISDBT etc.).

A network data field may give information about the Base Station the user equipment is connected to like, e.g., the cell ID, etc. A user data field may give information on the user (e.g., profile, ID, etc.). A time stamp parameter may give the time the event (e.g., battery charging start/stop) was triggered. A service data field may give information about service ID that has issued the location information. A location information field may comprise location information such as coordinates or ID for discrete point location, precision level speed, etc.

Figure 3:
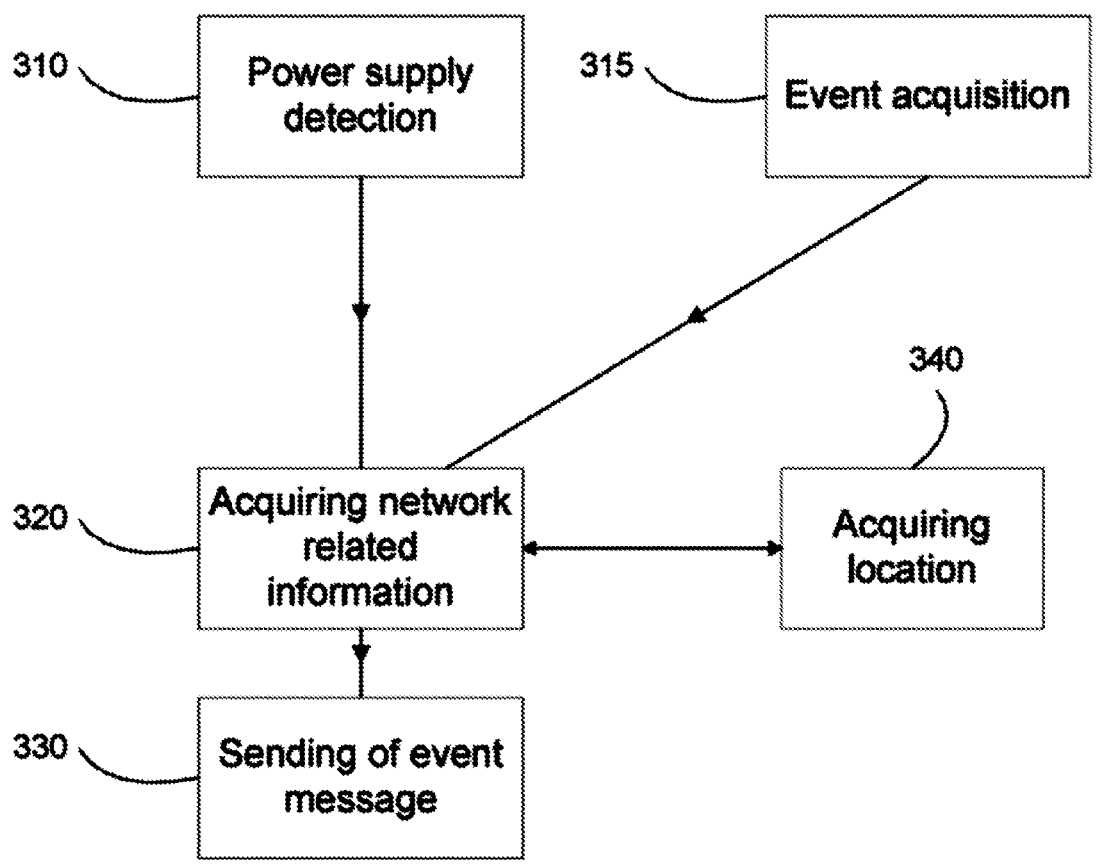
FIG. 3 schematically illustrates the method carried out by a user equipment according to an embodiment.

FIG. 3 describes the method on the user equipment according to one embodiment and wherein:
  the charging of the power supply of the user equipment is detected in an act 310;
  in an optional act 315, event acquisition such as key pressing, phone opening/closing, bar code or RFID scanning may also be detected
  network related information previously described in FIGS. 1 and 2 is acquired in an act 320;
  location information of the user equipment may be acquired in an option act 340;
  the event message comprising network related information and optionally location is sent to the telecommunication network in an act 330.
  QUESTION: could it be possible to create an act "315" that would perform event acquisition, power supply detection being one particular case?

Figure 4:
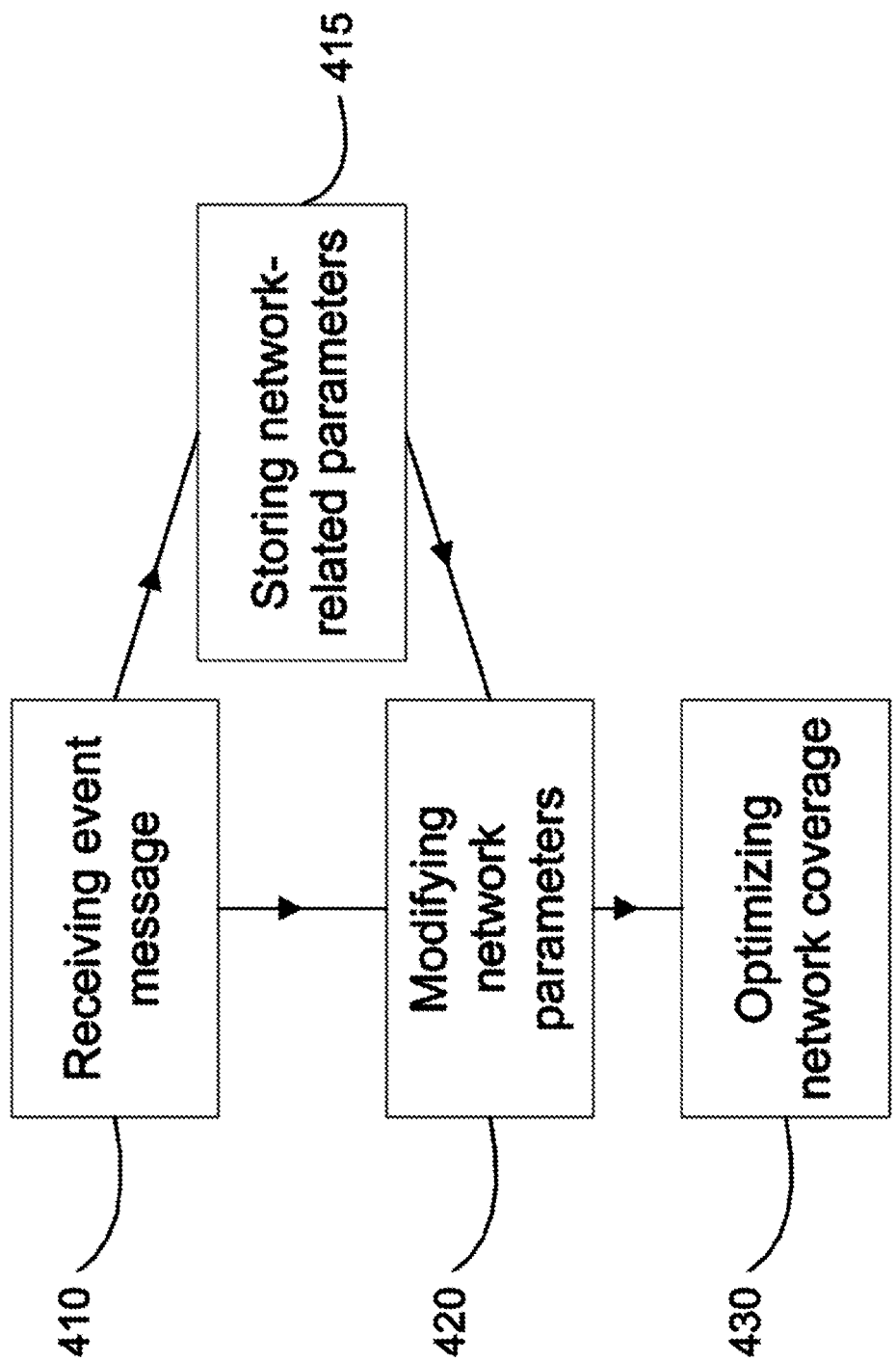
FIG. 4 schematically illustrates the method carried out in the telecommunication network according to an embodiment.

FIG. 4 describes the method in the telecommunication network according one embodiment and wherein:
  the event message described in FIG. 3 is received by the telecommunication network in an act 410;
  in an optional act 415, network-related information comprised in the event message may be stored by the telecommunication network;
  network parameters may be modified in an additional act 420 according to the received data (comprised in the event message) that comprise network related information and optionally location of the UE;
  the telecommunication network coverage is further optimized (coverage, quality of signal, quality of service, etc.) using the received data in an act 430.

Acts 420 and 430 are optional as they may depend upon the network operator policy for using network related information and taking corrective measures when identifying a region with limited coverage.

A user equipment may collect or acquire network related information from a plurality of networks. In an exemplary embodiment, a user equipment may collect network related information from a 3G telecommunication network (e.g., Universal Mobile Telecommunication System (UMTS)), a WiFi network and a WiMAX network upon detection of the charging of the battery and send this information to the sole 3G UMTS network. This multimode dimension may be illustrated for example for using the sufficient connectivity on one network to improve the coverage of another network—broadcast being a good example.

When the network related information from at least one of a second network is collected, it may be further sent to at least one of a first telecommunication network(s) the UE may be connected to, or will be connected to, either directly or upon a triggering event, e.g., later on or on request from at least one of said first network(s). "Directly" means in real time or straight upon detection of the charging event and upon collection of network related information. "Later on" means the network related information may be stored then send later. "On request" means that a request from at least one of a first network sends a request to the user equipment for the UE to send it the network collected information (e.g., once a month or else) or event message.

Besides, the act of acquiring or collecting the network related information may be uncorrelated with the detection in the sense that it may be done, e.g., periodically or before the event of charging detection.

Operations carried out by the UE and the telecommunication network may be both executed by a computer program.

The use of the connection to a power source as a location indicator is one example of event. Handling other types of events would be possible:
- RFID scanning
- 2D bar code
- GPS based Location events
- Zigbee (low power consumption UWB for indoor location)
- Short range data transmission (such as Bluetooth and IR). Transferring data between PC and mobile phone can give information on the location (about 30 cm far from the PC)

In the case of GPS based location event, a service tag specific to the services that has triggered the request for location can be integrated in the event structure.

Especially, the management of RFID or 2D bar codes provides a way to manage location events defined as discrete point.

The invention claimed is:

1. A method for a user equipment to transmit a set of data to at least a first telecommunication network, the user equipment comprising a rechargeable power supply, the method comprising the acts of:
   detecting charging of the rechargeable power supply performed at least partially over a physical connection;
   while the rechargeable power supply is charging:
      acquiring network related information from at least a second telecommunication network different from the first telecommunication network, by the user equipment, the network related information comprising information about a signal strength of the second communication network received by the user equipment; and
      acquiring location information of the user equipment; and
      initiating transmission of the set of data to the at least first telecommunication network via the physical connection, the set of data comprising the network related information, the location information of the user equipment, and user related information.

2. The method according to claim 1, wherein the set of data further comprises an indication of the charging of the power supply of the user equipment.

3. The method according to claim 1 wherein the physical connection is with a car.

4. A computer program providing computer executable instructions stored on a non-transitory computer readable medium, which when loaded on to a data processor causes the data processor to perform a method for a user equipment to transmit a set of data to at least a first telecommunication network according to claim 1.

5. A user equipment to transmit a set of data to at least a first telecommunication network, the user equipment comprising a rechargeable power supply and being operable to:
   detect charging of the rechargeable power supply performed at least partially over a physical connection;
   while the rechargeable power supply is charging:
      acquire network related information from at least a second telecommunication network different from the first telecommunication network, the network related information comprising information about a signal strength of the second communication network; and
      acquire location information of the user equipment; and
      initiate transmission of the set of data to the at least first telecommunication network via the physical connection, the set of data comprising the network related information, the location information of the user equipment, and user related information.

6. The user equipment according to claim 5 wherein the physical connection is with a car.

7. A telecommunication system comprising:
   an event manager in at least a first telecommunication network; and
   a user equipment to transmit a set of data to the event manager, the user equipment comprising a rechargeable power supply and being operable to:
   detect charging of the rechargeable power supply performed at least partially over a physical connection;
   while the rechargeable power supply is charging:
      acquire network related information from at least a second telecommunication network different from the first telecommunication network, the network related information comprising information about a signal strength of the second communication network; and
      acquire location information of the user equipment; and
      initiate transmission of the set of data to the at least first telecommunication network over the physical connection, the set of data comprising the network related information, the location information of the user equipment, and user related information.

* * * * *